US010666754B2

(12) United States Patent
Devarapalli et al.

(10) Patent No.: US 10,666,754 B2
(45) Date of Patent: May 26, 2020

(54) SYSTEM AND METHOD FOR CACHE RESERVATION IN AN INFORMATION HANDLING SYSTEM

(71) Applicant: Dell Products, LP, Round Rock, TX (US)

(72) Inventors: Kiran K. Devarapalli, Bangalore (IN); Chandrashekar Nelogal, Round Rock, TX (US); Krishnaprasad Koladi, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 250 days.

(21) Appl. No.: 14/725,608

(22) Filed: May 29, 2015

(65) Prior Publication Data
US 2016/0352856 A1 Dec. 1, 2016

(51) Int. Cl.
G06F 15/16 (2006.01)
H04L 29/08 (2006.01)
G06F 13/00 (2006.01)
G06F 9/50 (2006.01)

(52) U.S. Cl.
CPC ........ H04L 67/2842 (2013.01); G06F 9/5016 (2013.01); G06F 13/00 (2013.01)

(58) Field of Classification Search
CPC .................................................. H04L 67/2842
USPC ....................................................... 709/213
See application file for complete search history.

(56) References Cited

U.S. PATENT DOCUMENTS

| 5,537,572 A | 7/1996 | Michelsen et al. |
| 7,620,793 B1* | 11/2009 | Edmondson ............ G06F 12/00 711/208 |
| 8,825,937 B2 | 9/2014 | Atkisson et al. |
| 2006/0206752 A1 | 9/2006 | Ikeuchi et al. |
| 2008/0155190 A1 | 6/2008 | Ash et al. |
| 2013/0042237 A1* | 2/2013 | Cardona ............. G06F 12/0284 718/1 |
| 2015/0242343 A1* | 8/2015 | Atzmon ............. G06F 13/1673 710/267 |
| 2015/0254000 A1* | 9/2015 | Sivathanu ........... G06F 12/0868 711/103 |
| 2016/0077884 A1* | 3/2016 | Hunter .................. G06F 9/5077 718/104 |
| 2016/0179682 A1* | 6/2016 | Moretti ............... G06F 12/0871 711/125 |

* cited by examiner

Primary Examiner — Norman Abedin
(74) Attorney, Agent, or Firm — Larson Newman, LLP

(57) ABSTRACT

An information handling system includes first and second servers, and a storage controller. The storage controller to initialize a first virtual function for the first server, to initialize a second virtual function for the second server, to assign equal amounts of a first portion of a memory to the first and second virtual functions, to profile an input/output workload of the first and second virtual functions, to allocate amounts of a second portion of the memory to the first and second virtual functions based on a first input/output profile of each of the virtual functions, and to allocate a remaining portion of the memory as a global section of the memory for use by any of the virtual functions.

19 Claims, 3 Drawing Sheets

SYSTEM AND METHOD FOR CACHE RESERVATION IN AN INFORMATION HANDLING SYSTEM

FIELD OF THE DISCLOSURE

The present disclosure generally relates to information handling systems, and more particularly relates to cache reservation in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination. An information handling system involved in data storage can cache data that is to be written to a hard disk drive during a write operation before the data is actually written to the hard disk drive.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
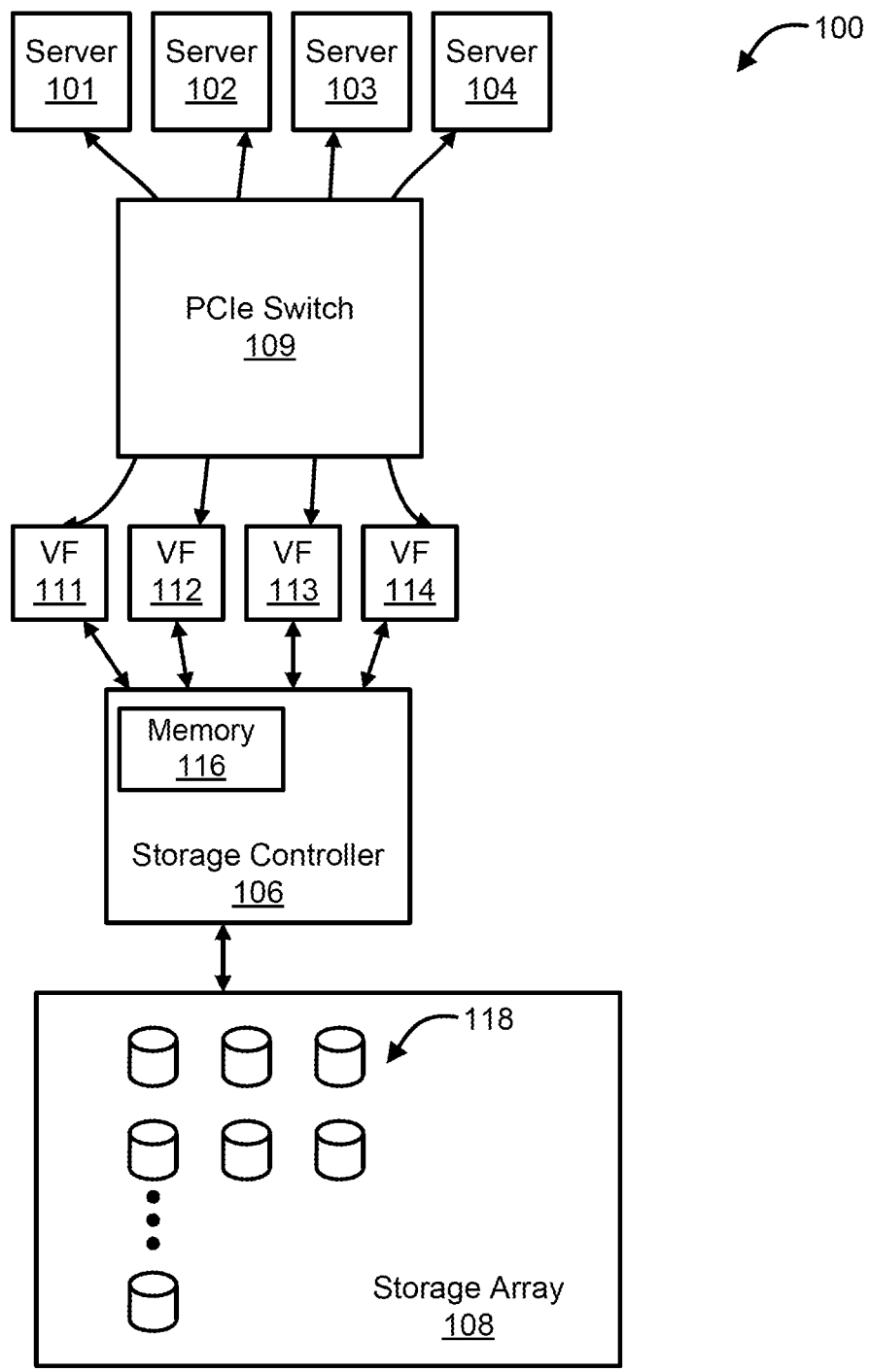
FIG. 1 is a block diagram illustrating an information handling system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer, such as desktop or laptop, tablet computer, mobile device (e.g., personal digital assistant (PDA) or smart phone), server (such as blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (IO) devices, such as a keyboard, a mouse, touchscreen and/or a video display. The information handling system may also include one or more buses operable to transmit communications between the various hardware components.

In an embodiment, an information handling system includes multiple servers, a storage controller, and a storage array. In an embodiment, the storage controller can include a memory that can be utilized by the storage controller to temporarily store data received from a server that is to be written to the storage array. During operation, the storage array can initialize multiple virtual functions that correspond to the different servers within the information handling system. The servers can perform input/output (IO) operations to provide data to or receive data from the data storage array via the virtual functions initialized by the storage controller.

Upon initializing the virtual functions, the storage controller can partition the memory of the storage controller into different portions or sections that can be utilized by the virtual functions for IO operations in the information handling system. The storage controller can define a first predetermined amount of a total cache space in the memory as a first portion of the memory. The storage controller can then assign each of the virtual functions equal amounts of the first portion of the memory. In an embodiment, the storage controller can profile a representative workload for each of the virtual functions. For example, the storage controller can profile the amount of data to be written or read by a virtual function, number of IO operations each of the virtual functions performs, the amount of the total cache space of the memory to be utilized by each of the virtual functions, or the like. The storage controller can then allocate specific amounts of a second portion of the memory to the each of the virtual functions based on an IO profile of each of the virtual functions. The storage controller can also define the remaining amount of the total cache space in the memory as a global portion of the memory to be utilized by all of the virtual functions.

FIG. 1 illustrates a block diagram an information handling system or storage subsystem 100 according to an embodiment of the present disclosure. In an embodiment, the information handling system 100 includes servers 101, 102, 103, and 104, a storage controller 106, a storage array 108, and peripheral component interconnect express (PCIe) switch 109. In an embodiment, the storage controller 106 can be a redundant array of independent disks (RAID) controller, which can control reading data from and writing data to the storage array 108. In an embodiment, the PCIe switch 109 provide a connection between the servers 101-104 and one or more controllers or other cards inserted into the information handling system 100 via the PCIe switch. In an embodiment, the storage controller 106 can include a memory 116, and the memory can be utilized by the storage controller to temporarily store data received from the servers 101-104 that is to be written to the storage array 108.

During operation, the storage controller 106 can initialize multiple virtual functions, such as virtual functions 111, 112, 113, and 114. In an embodiment, each of the virtual functions 111, 112, 113, and 114 corresponds to a different server, such as server 101, 102, 103, and 104, within the information handling system 100. In an embodiment, the servers 101-104 perform input/output (IO) operations to provide data to or receive data from a data storage array 108 via the virtual functions 111-114 initialized by the storage controller 106. In an embodiment, the storage controller 106 can divide or partition the storage array 108 into multiple storage devices 118 that can be assigned to and accessed by the virtual functions 111-114 during read and write operations.

Upon initializing the virtual functions 111-114, the storage controller 106 can partition the memory 116 into different portions or sections that can be utilized by the virtual functions 111-114 for IO operations in the information handling system 100. In an embodiment, the storage controller 106 can divide the memory 116 into different portions, as shown in FIGS. 2 and 3, depending on different IO profiles of the virtual functions.

Figure 2:
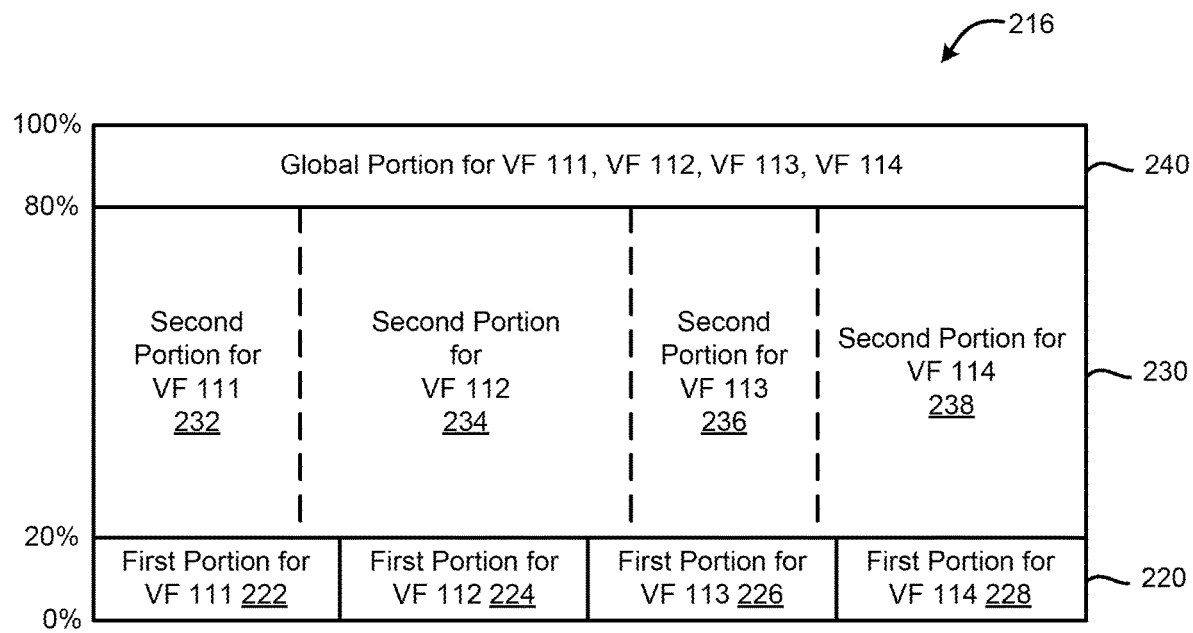
FIG. 2 is a diagram representing partitions in a cache memory of a controller in the information handling system according to an embodiment of the present disclosure.
Figure 3:
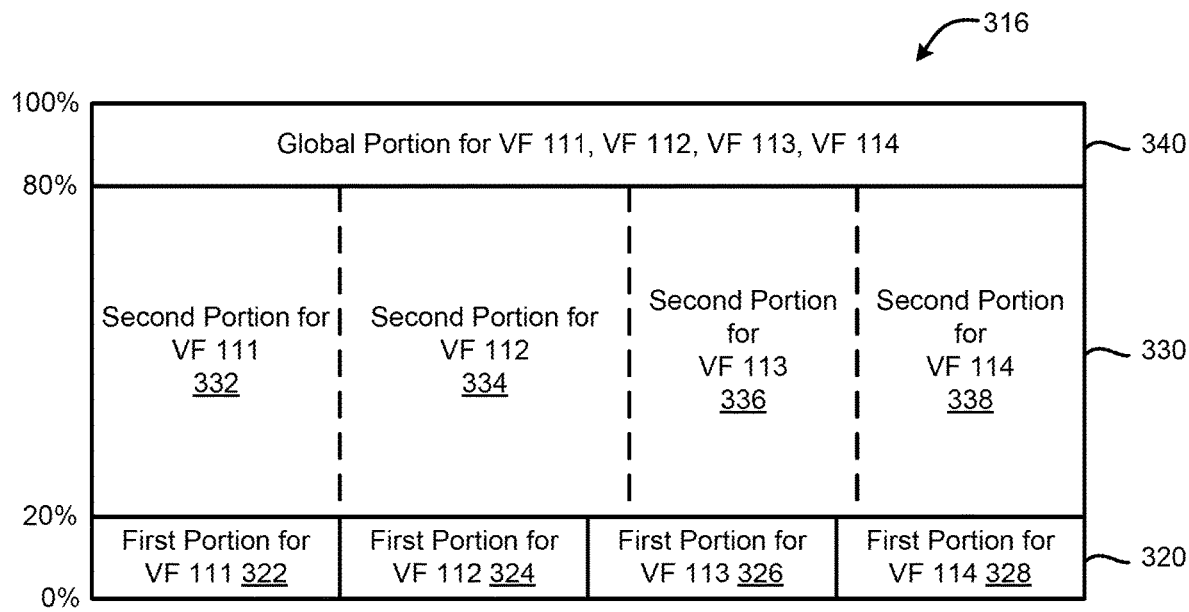
FIG. 3 is another diagram representing partitions in the cache memory of the controller in the information handling system according to an embodiment of the present disclosure.

FIG. 2 illustrates a diagram representing partitions in a memory 216 of a storage controller, such as storage controller 106 in the information handling system 100 of FIG. 1, divided into a first portion 220, a second portion 230, and a global portion 240 according to an embodiment of the present disclosure. FIG. 3 illustrates a diagram representing partitions in a memory 316 of a storage controller, such as storage controller 106 in the information handling system 100 of FIG. 1, divided into a first portion 320, a second portion 330, and a global portion 340 according to an embodiment of the present disclosure. The partitioning of the memory 116 will be described with respect to FIGS. 1, 2, and 3.

The storage controller 106 can define a first predetermined amount of a total cache space in the memory 116 as a first portion of the memory. In an embodiment, the first predetermined amount can be a specific percentage of the total cache space. For example, the first predetermined amount can be 5%, 10%, 20%, or the like of the total cache space of memory 116. In two particular examples, as shown in FIGS. 2 and 3, a first portion 220 or 320 can be 20% of the total cache space of the respective memory 216 or 316.

The storage controller 106 can then assign each of the virtual functions 111-114 equal amounts of the first portion of the memory 116. In an embodiment, the storage controller can assign and/or allocate each of the virtual functions an equal percentage of the first portion. As shown in FIG. 2, each of the virtual functions 111, 112, 113, and 114 are assigned or allocated an equal percentage of the first portion 220. For example, virtual function 111 is assigned portion 222 of first portion 220, virtual function 112 is assigned portion 224, virtual function 113 is assigned portion 226, and virtual function 114 is assigned portion 228. In this example, each of the four virtual functions 111-114 can be assigned 25% of the first portion 220, which is 5% of the total cache space of memory 216.

As shown in FIG. 3, each of the virtual functions 111, 112, 113, and 114 are similarly assigned or allocated an equal percentage of the first portion 320. For example, virtual function 111 is assigned portion 322 of first portion 320, virtual function 112 is assigned portion 324, virtual function 113 is assigned portion 326, and virtual function 114 is assigned portion 328. In an embodiment, the first portion 220 or 320 of the memory 216 or 316 allocated to each of the virtual functions 111-114 enables a particular quality of service (QoS) for IO operations of the virtual functions to be met. In particular, each virtual function 111-114 is always provided a specific amount of the total cache space of the memory 116, such that a virtual function can always have access to a predetermined amount of the total cache space even if one virtual function is not performing any IO operations while the other virtual functions are performing a lot of IO operations.

Referring back to FIG. 1, after the storage controller 106 has allocated or reserved a predetermined amount of the memory 116 to each of the virtual functions 111-114, the storage controller can start receiving IO requests from the virtual functions and can temporarily store the data associated with write requests in the section of the first portion 220 of the memory allocated to that particular virtual function. For example, if virtual function 111 is associated section 222 of the first portion 220 in FIG. 2, the storage controller 106 can cache data received from the virtual function 111 in section 222 of the memory 216 prior to writing the data to the storage devices 118 of the storage array 108.

The storage controller 106 can define a second predetermined amount of the total cache space in the memory 116 as a second portion of the memory, such as second portion 230 of FIG. 2 and second portion 330 of FIG. 3. In an embodiment, the second portion can be a specific percentage of the total cache space in the memory 116. For example, the second predetermined amount can be 40%, 60%, 75%, 80%, or the like of the total cache space. The storage controller 106 can then define the remaining amount of the total cache space in the memory 116 as a global portion of the memory. In an embodiment, the global portion can be a specific percentage of the total cache space. For example, the second predetermined amount can be 5%, 7%, 15%, 20%, or the like of the total cache space of the memory 116. In two particular examples, as shown in FIGS. 2 and 3, global portion 240 or 340 can be 20% of the total cache space of the respective memory 216 or 316. In an embodiment, write data associated with any of the virtual functions 111-114 can be cached in the global portion of the memory 116 in response to the first portion and section portion allocated to a particular virtual function being full. For example, if the storage controller 106 receives a write request from virtual function 114, the storage controller can first determine whether sections of the first portion 220 and the second portion 230 allocated to the virtual function 114 are full. If these sections in the memory 216 are full, the storage controller 106 can then cache the data associated with the write request from virtual function 114 in the global portion 240.

The storage controller 106 can determine whether a request to profile the IO workload of each of the virtual functions 111-114 has been received, whether a specific period of time as expired, or the like. If the specific period of time has expired or a request to profile the IO workload has been received, the storage controller 106 can profile the IO workload of each of the virtual functions 111, 112, 113, and 114. In an embodiment, the storage controller 106 can profile the amount of data written or read by a virtual function, number of IO operations each of the virtual functions performs, the amount of the total cache space of the memory 116 utilized by each of the virtual functions, or the like. For example, the virtual function 114 may perform a high number of IO operations, but each of the IO operations may only include a small amount of data, such that the overall use of the total cache space in the memory 116 is lower than that used by virtual function 112 that may perform a smaller number of IO operation with each operation involving a large amount of data. In an embodiment, the storage controller 106 can determine the IO workload for each of the virtual functions 111, 112, 113, and 114 by determining a representative workload during a profile time window, and this representative workload can be used to determine future workloads of the virtual functions.

The storage controller can then allocate specific amounts of the second portion of the memory 116 to the each of the virtual functions 111-114 based on a first IO profile of each of the virtual functions. For example, referring to FIG. 2, if the first IO profile of the virtual function 111 indicates that the virtual function 111 consumes more of the total cache space in memory 216 than virtual function 113, the storage controller 106 can allocate the virtual function 111 a larger section of the second portion 230 than the virtual function 113. In an embodiment, storage controller 106 can allocate the virtual functions 111-114 different amounts of the second portion 220 that are proportional to the usage of the total cache space in memory 116 by the virtual function. For example, the virtual function 111 can be allocated section 232 of the second portion 230, the virtual function 112 can be allocated section 234, the virtual function 113 can be allocated section 236, and the virtual function 114 can be allocated section 238, as shown in FIG. 2.

While the storage controller 106 is utilizing the different sections of total cache space for IO operations of the virtual functions 111-114, the storage controller can implement a cache replacement algorithm with respect to the portions assigned to each virtual function. For example, the storage controller 106 implements a first cache replacement algorithm for all of the portions or sections of the memory 116 assigned to the first virtual function 111, a second cache replacement algorithm for all of the portions or sections of the memory assigned to the second virtual function 112, a third cache replacement algorithm for all of the portions or sections of the memory assigned to the third virtual function 113, and a fourth cache replacement algorithm for all of the portions or sections of the memory assigned to the fourth virtual function 114.

In an embodiment, the storage controller 106 can utilize the cache replacement algorithm to control what, if any, lines of the cache memory 116 assigned to a particular virtual function are replaced by newly received data to be written to the data storage array 108. For example, if a new write request is received from the first virtual function 111, the storage controller 106 can apply the cache replacement algorithm only to the portions of the memory allocated to the first virtual function. In an embodiment, the data that has been least recently used in the cache, the data in the cache the longest amount of time, the data in the cache the shortest amount of time, or the like can be the data that is replaced if the data in memory 116 is full and new data to be written is received.

As the storage controller 106 continues to read and write data from the memory 116, the storage controller 106 can determine whether the time interval has expired or whether a request to profile the IO workloads has been received. When the time interval has expired, the storage controller 106 can create a second IO profile for each of the virtual functions 111-114 based on an updated IO workload of the virtual functions. The storage controller 106 can then be re-allocated the second portion of the memory 116 to each of the virtual functions based on second IO profile of each of the virtual functions. For example, the storage controller 106 can allocate different sections of the second portion 340 of the memory 316 in FIG. 3 based on the second IO profile of each of the virtual functions 111-114. In an embodiment, the virtual function 111 can be allocated section 332 of the second portion 330, the virtual function 112 can be allocated section 334, the virtual function 113 can be allocated section 336, and the virtual function 114 can be allocated section 338. In an embodiment, the storage controller 106 can allocate the portions of the memory 116 without determining whether the specific time interval has expired. In this embodiment, the first allocation of the different portions of the memory 116 can be utilized in perpetuity, such that re-allocation of the portions is not performed.

Thus, the storage controller 106 divide the memory 116 into different portions, and then allocate sections of these portions to the virtual functions 111-114 of the information handling system 100. In an embodiment, the allocation of the portions can be done to provide a particular quality of service for each of the virtual functions 111-114, can be based on IO workload profile of each of the virtual functions, or the like.

Figure 4:
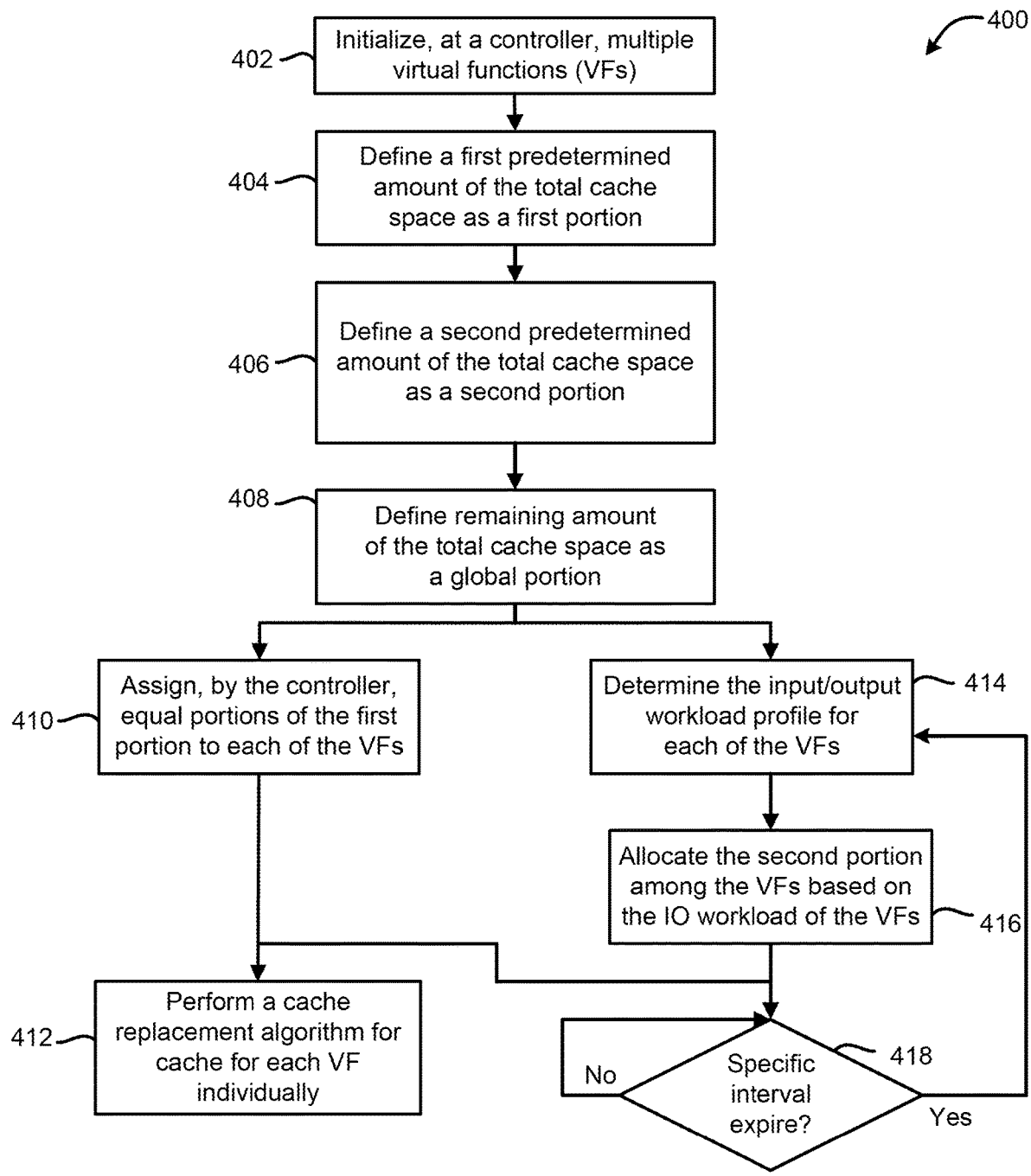
FIG. 4 is a flow diagram illustrating a method for partitioning the cache memory to allocate portions of the cache memory for different virtual functions in the information handling system according to an embodiment of the present disclosure.

FIG. 4 illustrates a flow diagram illustrating a method 400 for partitioning a cache memory to allocate portions of the cache memory for different virtual functions in an information handling system according to an embodiment of the present disclosure. At block 402, multiple virtual functions are initialized. In an embodiment, each of the virtual functions corresponds to a different server within the information handling system. In an embodiment, the servers perform read/write operations to provide data to or receive data from a data storage array via the virtual functions initialized by the storage controller.

In an embodiment, the storage controller includes a cache memory to temporarily store data in response to a write request of an IO operation of one of the virtual functions prior to completing the write request and writing the data to a storage array. At block 404, a first predetermined amount of a total cache space in the memory of the storage controller is defined as a first portion of the memory. In an embodiment, the first predetermined amount defined as the first portion can be a specific percentage of the total cache space. For example, the first predetermined amount can be 5%, 10%, 20%, or the like of the total cache space. At block 406, a second predetermined amount of the total cache space in the memory of the storage controller is defined as a second portion of the memory. In an embodiment, the second predetermined amount defined as the second portion can be a specific percentage of the total cache space. For example, the second predetermined amount can be 40%, 60%, 75%, 80%, or the like of the total cache space.

At block 408, the remaining amount of the total cache space in the memory of the storage controller is defined as a global portion of the memory. In an embodiment, the remaining amount defined as the global portion can be a specific percentage of the total cache space. For example, the second predetermined amount can be 5%, 7%, 15%, 20%, or the like of the total cache space. In an embodiment, each of the virtual functions can utilize the global portion to temporarily stored data associated with a write request after the first and second portions assigned to that virtual function have been filled.

Equal amounts of the first portion are assigned to the each of virtual functions at block 410. In an embodiment, the storage controller can assign and/or allocate each of the virtual functions an equal percentage of the first portion. For example, if there are five virtual functions and the first portion is 20% of the total cache space, each virtual function can be assigned 20% of the first portion or 4% of the total cache space. In an embodiment, the first portion of the memory allocated to each of the virtual functions enables a particular quality of service for IO operations of the virtual functions to be met.

At block 412, a cache replacement algorithm is performed or executed with respect to each virtual function. In an embodiment, the cache replacement algorithm controls what, if any, lines or sections of the cache are replaced by newly received data to be written to the data storage array. In an embodiment, the data that has been least recently used in the cache, the data in the cache the longest amount of time, the data the shortest amount of time, or the like can be the data that is replaced if the cache is full and new data to be written is received.

At block 414, an input/output (IO) workload of each of the virtual functions is profiled. In an embodiment, the storage controller can profile the amount or number of IO operations each of the virtual functions performs, the amount of the total cache space utilized by each of the virtual functions, or the like. For example, one of the virtual functions can perform a high number of IO operations, but each of the IO operations may only include a small amount of data, such that the over use of the total cache space is lower than a virtual function performing a smaller number of IO operation with each operation involving a large amount of data.

At block 416, amounts of the second portion of the memory can be allocated to the each of the virtual functions based on a first IO profile of each of the virtual functions. For example, if the first IO profile of a first virtual function indicates that the first virtual function consumes more of the cache memory than a second virtual function, then the first virtual function can be allocated more of the second portion of the total cache space. In an embodiment, the virtual functions can be allocated different amounts of the second portion that are proportional to the usage of the cache memory by the virtual functions. For example, if a the IO operations of a first virtual function utilizes twice the amount of cache memory space as compared to a second virtual function, the storage controller can allocated the first virtual function twice as much of the second portion as the second virtual.

At block 418, a determination is made whether a time interval has expired. In an embodiment, the length of the time interval can be set by a user of the information handling system. When the time interval has expired the flow continues at block 414. In an embodiment, the determination of whether the time interval has expired can be made at any point in time after the memory has been allocated to each of the virtual functions. In an embodiment, the operations of block 418 can be performed in without any dependency on the operation of block 412.

When the time interval has expired, a second IO profile can be determined for each of the virtual functions based on an updated IO workload of the virtual functions at block 414, and the second portion of the memory can be re-allocated to each of the virtual functions based on second IO profile of each of the virtual functions at block 416. In an embodiment, the flow of FIG. 4 can be without determining whether the specific time interval has expired in block 418. In this embodiment, the first allocation of the different portions of the memory can be utilized in perpetuity, such that re-allocation of the portions is not performed.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   initializing, by a storage controller, a first virtual function and a second virtual function;
   assigning, by the storage controller, equal amounts of a first portion of a memory to each of the first and second virtual functions, wherein the memory is configured as a cache memory between the first and second virtual functions and a storage array;
   profiling, within a profile time window, an amount of data to be written or read by each of the first and second virtual functions on the storage array;
   allocating, by the storage controller, amounts of a second portion of the cache memory based on the profiled amount of data to be written or read; and
   determining future allocations of the second portion of the cache memory based on the profiling within the profile time window of the first portion, wherein a remaining portion of the cache memory is entirely allocated to the first virtual function of the second virtual function that requests data write or read when the corresponding determined future allocation in the second portion has been filled.

2. The method of claim 1, further comprising:
   determining that a time interval has expired;
   profiling the amount of data to be written or read by the first and second virtual functions to create a second profile; and re-allocating, by the storage controller, the second portion of the cache memory based on the created second profile.

3. The method of claim 1, wherein the cache memory is disposed within the storage controller.

4. The method of claim 1, further comprising:
performing, by the storage controller, a cache replacement algorithm for portions of the memory allocated to the first virtual function.

5. The method of claim 1, further comprising:
performing, by the storage controller, a cache replacement algorithm for portions of the memory allocated to the second virtual function.

6. The method of claim 1, wherein the profiled amount of data includes number of input/output operations that the first and second virtual functions perform on the storage array.

7. The method of claim 1, wherein the first portion of the memory reserves a predetermined amount of the memory for the first and second virtual functions to enable a quality of service for input/output operations of the first and second virtual functions.

8. An information handling system comprising:
first and second servers; and
a storage controller configured to communicate with the first and second servers, the storage controller to initialize a first virtual function for the first server and a second virtual function for the second server, to assign equal amounts of a first portion of a memory to each of the virtual functions, wherein the memory is used as a cache memory between the first and second virtual functions and a storage array, to profile within a profile time window an amount of data to be written or read by each of the virtual functions on the storage array, to allocate amounts of a second portion of the memory based on the profiled amount of data to be written or read, and to determine future allocations of the second portion of the memory based on the profiling within the profile time window of the first portion, wherein a remaining portion of the cache memory is entirely allocated to the first virtual function or the second virtual function that requests data write or read when the corresponding determined future allocation in the second portion has been filled.

9. The information handling system of claim 8, the storage controller further to determine that a time interval has expired, to receive a request to profile the amount of data to be written or read by the virtual functions to create a second profile, and to re-allocate the second portion of the memory between the virtual functions based on the second profile.

10. The information handling system of claim 8, wherein the memory includes the cache memory within the storage controller.

11. The information handling system of claim 8, the storage controller further to perform a cache replacement algorithm for portions of the memory allocated to the first virtual function.

12. The information handling system of claim 8, the storage controller further to perform a cache replacement algorithm for portions of the memory allocated to the second virtual function.

13. The information handling system of claim 8, wherein the profiled amount of data includes number of input/output operations that the virtual functions perform on the storage array.

14. The information handling system of claim 8, wherein the first portion of the memory reserves a predetermined amount of the memory for the first and second virtual functions to enable a quality of service for input/output operations of the first and second virtual functions.

15. A method comprising:
initializing, at a storage controller, a first virtual function and a second virtual function;
assigning, by the storage controller, amounts of a first portion of a memory to the virtual functions, wherein the memory is used as a cache memory between the first and second virtual functions and a storage array;
profiling during a profile time window an amount of data to be written or read by each of the first and second virtual functions on the storage array;
allocating, by the storage controller, amounts of a second portion of the memory to each of the virtual functions based on the profiled amount of data to be written or read;
determining future allocations of the second portion of the memory based on the profiling within the profile time window of the first portion; and
allocating entirely a remaining portion of the memory to the first virtual function or the second virtual function that requests data write or read when the corresponding determined future allocation in the second portion has been filled.

16. The method of claim 15, further comprising:
performing, by the storage controller, a cache replacement algorithm for portions of the memory allocated to the first virtual function.

17. The method of claim 15, further comprising:
performing, by the storage controller, a cache replacement algorithm for portions of the memory allocated to the second virtual function.

18. The method of claim 15, wherein the profiled amount of data includes a number of input/output operations that the virtual functions perform on the storage array.

19. The method of claim 15, wherein the first portion of the memory reserves a predetermined amount of the memory for the first and second virtual functions to enable a quality of service for input/output operations of the first and second virtual functions.

* * * * *

UNITED STATES PATENT AND TRADEMARK OFFICE
CERTIFICATE OF CORRECTION

PATENT NO. : 10,666,754 B2
APPLICATION NO. : 14/725608
DATED : May 26, 2020
INVENTOR(S) : Kiran K. Devarapalli et al.

Page 1 of 1

It is certified that error appears in the above-identified patent and that said Letters Patent is hereby corrected as shown below:

In the Claims

Column 8, Line 59: Please change "function of the" to --function or the--

Signed and Sealed this
Seventh Day of July, 2020

Andrei Iancu
*Director of the United States Patent and Trademark Office*